United States Patent [19]

Harrison

[11] Patent Number: 4,799,355
[45] Date of Patent: Jan. 24, 1989

[54] BRAKE ACTUATION SYSTEMS FOR VEHICLES

[75] Inventor: Anthony W. Harrison, Selly Oak, England

[73] Assignee: Lucas Industries public limited company, Birmingham, England

[21] Appl. No.: 894,858

[22] Filed: Aug. 8, 1986

[30] Foreign Application Priority Data

Aug. 13, 1985 [GB] United Kingdom ............... 8520280

[51] Int. Cl.$^4$ ............................................. B60T 11/20
[52] U.S. Cl. ...................................... 60/562; 60/486; 417/385; 417/425
[58] Field of Search ................. 60/562, 486, 428; 417/425, 385

[56] References Cited

U.S. PATENT DOCUMENTS

| 54,291 | 5/1866 | Cameron | 417/425 |
| 1,797,245 | 3/1931 | Schaer | 417/385 |
| 2,413,876 | 1/1947 | Lefler | 60/486 |
| 4,087,968 | 5/1978 | Bianchetta | 60/486 |
| 4,117,681 | 10/1978 | Falk | 60/562 |
| 4,364,336 | 12/1982 | Skala | 123/14 |

FOREIGN PATENT DOCUMENTS 708098 4/1965 Canada ..................... 60/562

Primary Examiner—A. Michael Chambers
Attorney, Agent, or Firm—Scrivener and Clarke

[57] ABSTRACT

The present specification discloses a brake actuation system for a vehicle, which is applicable to both hydraulically or pneumatically operated/spring released brakes and spring operated/hydraulically or pneumatically released brakes. With such brakes it is often necessary to have secondary means for brake operation or release. Such braking systems thus have primary and secondary means for brake operation or release. The present invention provides a fail-safe system which can provide at least an indication of impending failure. The brake actuation system of the present invention comprises a cylinder within which two axially aligned pistons are axially slidable, the space between one end of the cylinder and one piston being connected to a primary power system and the space between said pistons being connected to a secondary power system. When such an actuation system is used in a spring operated/hydraulically released braking system, the primary power system of the present invention is the primary brake release and the secondary power system is a secondary or emergency release which may constitute a handpump. By providing suitable flow detection means in the primary and secondary power systems, leakage past piston seals can be monitored and detected before the seal failure is sufficient to dangerously affect brake performance.

9 Claims, 2 Drawing Sheets

BRAKE ACTUATION SYSTEMS FOR VEHICLES

The present invention relates to a brake actuation system for a vehicle.

In particular the present invention relates to a fail-safe system for use in vehicle braking systems, the fail-safe system being applicable to hydraulically or pneumatically operated/spring released brakes, but being especially applicable to spring operated/hydraulically or pneumatically released brakes. For the sake of clarity the present invention will be solely described hereinafter with reference to spring operated/hydraulically released brakes.

Where a spring operated/hydraulically released brake is used it is often necessary to have a secondary means of brake release. This becomes vital in the case of some railway and tramcar applications when the brake cylinders are inaccessible and it is necessary to move a disabled vehicle quickly. Such braking systems thus have a primary brake release system and a secondary release system and the aim of the present invention is to modify the primary and secondary release systems to provide a fail-safe system, to at least give an indication of impending failure, e.g. brake seal leak in the case of hydraulically released brakes. A backup such as this is particularly useful in driverless trams which are computer controlled.

According to the present invention there is provided a brake actuation system comprising two pistons which are axially slidable in a common volume, the space between one end of the volume and one piston being connected to a primary power system and the space between said piston being connected to a secondary power system, said second piston acting to control the brake.

Preferably the common volume is formed by a cylindrical cavity within which the two pistons are coaxially located.

Considering the case of a spring operated/hydraulically released braking system, the primary power system of the present invention is the primary release for the brakes and the secondary power system is a secondary or emergency release which may constitute a handpump. Said one piston is therefore the power piston and said other piston is the secondary brake release piston. In other types of braking system the pistons will take on different roles. For normal brake release the power piston and the secondary release piston move 'as one'. However, for emergency release, the secondary power system, e.g. handpump, will be operated to pressurise the space between the pistons, causing only the secondary release piston to move axially in the cylinder, to release the brake. For normal braking the handpump system will be open to the reservoir of hydraulic fluid which is preferably common with the power system reservoir. In this way any leakage past the power piston seal will flow into the space between the pistons and then back to the reservoir via the handpump. Experience has shown that high pressure seals such as required on the power piston, do not suddenly develop a large leak which is beyond the compensating capability of the power system. Any such leakage past the power piston seal will thus be made up by the power system, further hydraulic fluid being supplied to the power piston so that no loss of brake performance is initially caused. The leakage of flow may be detected in a variety of ways:

(a) A suitable controller, e.g. computer, can be programmed to detect the occurrence of the power system pump 'cutting in' when there is no legitimate demand on the power system. Alternatively flow detectors may be installed in the power system.

(b) In the case where a common reservoir of hydraulic fluid is used for the power system and the handpump system, the use of a weir in the reservoir, besides preventing the total loss of hydraulic fluid if, say, a pipe breaks in one system, also provides a change in fluid levels as a result of the leakage described above. Such a change in levels can be easily detected and interpreted by a suitably programmed controller to indicate whether or not the leakage is dangerous, requiring immediate attention, or if it can be safely left until the next regular service.

(c) A flow detector is located in the line connecting the space between the pistons to the handpump and reservoir. Any flow in this line when the handpump is not used, indicates a power piston seal leakage. Legitimate flow in this line occurs when the handpump system is depressurised and this flow allows the detector to be checked.

It will be appreciated that the seals on the secondary brake release piston are only occasionally pressurised so that they will suffer almost no wear. If a detection system using a common reservoir with a weir is used, as referred to hereabove, then the secondary brake release piston seals will be monitored for leakage under almost zero pressure—i.e. a condition most likely to cause leakage. When the handpump pressurises these seals then the probability of leakage is further reduced, so the monitoring systems described are considered adequate.

The present invention will now be further described, by way of example, with reference to the accompanying drawings, in which:

FIG. 1 schematically illustrates one embodiment of a brake actuation system constructed according to the present invention;

Figure 1:
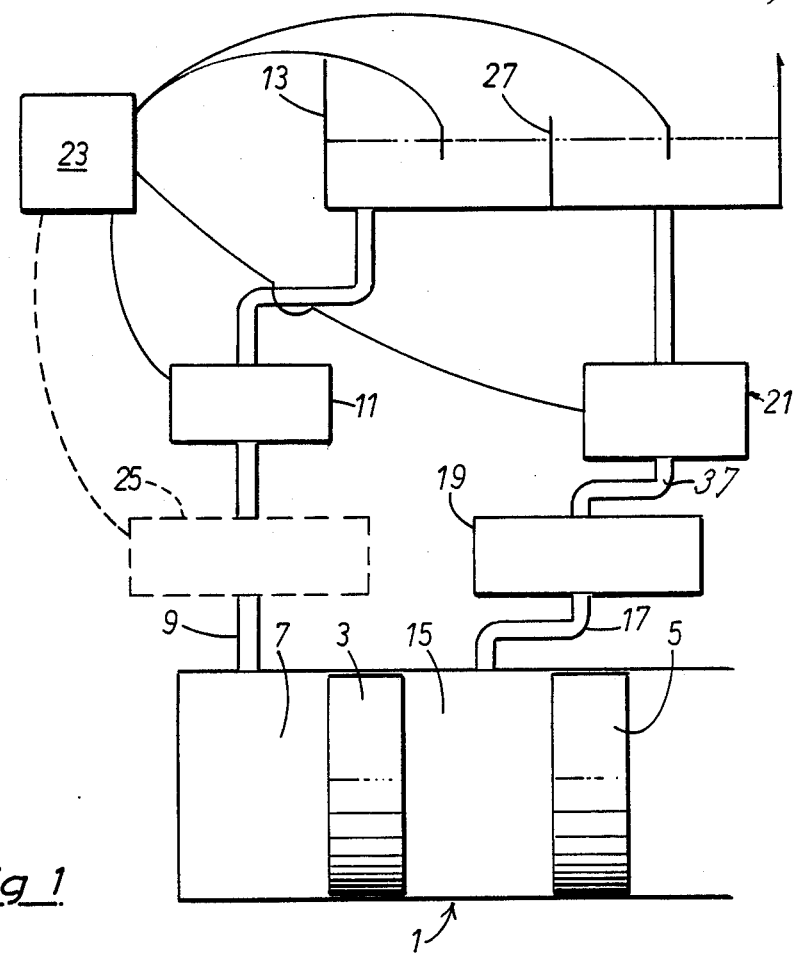
Figure 2:
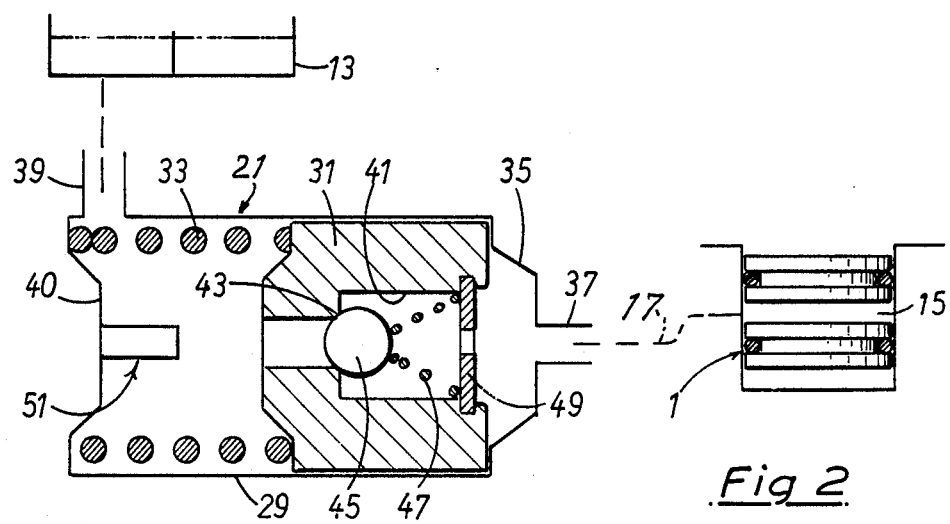
FIG. 2 is an enlarged cross-sectional view of a flow detector suitable for use in the embodiment of FIG. 1.

The brake actuation system illustrated in FIGS. 1 and 2 of the accompanying drawings is for use in releasing the brakes of a braking system wherein the brakes are spring applied. The brake actuation system comprises a cylinder 1 within which a power piston 3 and a secondary brake release piston 5 are axially displaceable. The cylinder space 7 adjacent solely to the power piston 3 is connected via line 9 to a power system pump 11, the pump 11 connecting with a reservoir 13 of hydraulic fluid. The cylinder space 15 between the pistons 3,5 is connected via line 17 to a handpump 19, a flow detector 21 and then to the reservoir 13.

The power piston 3 is normally operated to release the brakes, by pressurising cylinder space 7 using the pump 11 which draws hydraulic fluid from the reservoir 13. The secondary brake release piston 5 is in tandem with the power piston 3 and normally moves 'as one' with it for normal power operation. When operated, the handpump 19 pressurises the space 15 between the pistons 3,5 so that for emergency use only the second piston 5 moves to release the brake. For normal power operation the handpump line 17 is open to the common reservoir 13. Thus leakage past the seal on the power piston 3 will flow into cylinder space 15 and then via the handpump line 17 to the reservoir. Experience has shown that high pressure seals such as necessary on the power piston 3 do not suddenly develop a large leak which is beyond the compensating capability of the power system. Thus such a leakage past the power piston 3 will be made up by the power pump 11 with no loss in brake performance.

Leakage flow past the power piston can be detected as follows:

(a) A controller 23 e.g., a computer, can be programmed to detect when the power pump 11 'cuts in' when there is no legitimate demand on the system. Alternatively a flow detector 25—shown in dashed lines—may be installed in the power line 9. A suitable flow detector is described hereinafter.

(b) The reservoir 13 is provided with a weir 27 which divides the reservoir into a power system supply side and a handpump supply side. Besides preventing a total loss of hydraulic fluid if, say, a line breaks in either the power or the handpump system, the weir 27 also forces a change in fluid levels as a result of leakage past the power piston 3. Such a change in levels can be easily detected and interpreted by controller 23 according to the following table:

| Handpump side | Power side | | Interpretation |
|---|---|---|---|
| HIGH | LOW | LOW | |
| No | No | No | Nothing wrong |
| No | No | Yes | System failure see note 1 |
| No | Yes | No | System failure see note 2 |
| No | Yes | Yes | System failure see note 3 |
| Yes | No | No | } brake seal leak |
| Yes | No | Yes | } see note 4 |
| Yes | Yes | No | } detector malfunction |
| Yes | Yes | Yes | } |

Note 1 there is immediate danger of the power system failing completely;
Note 2 the handpump system has failed. There is no immediate danger but no checks or backup is available.
Note 3 there is immediate danger - both systems have failed.
Note 4 there is a power piston seal leak - there is no immediate danger and maintenance can be arranged when convenient.

(c) A flow detector 21 is provided in the handpump line 17. Any flow in this line 17 when the handpump 19 is not in use, indicates a leakage past the seal on the power piston 3. Legitimate return flow in this handpump line 17 occurs when the handpump system is depressurised. This action allows the detector 21 to be checked.

FIG. 2 of the accompanying drawings shows flow detector 21 in cross-section. Flow detector can be identical and a description of one is a description of both. 25 in the system shown in FIG. 1. Flow detector 21 shown in FIG. 2 comprises a cylinder 29 with an axially displaceable detector piston 31 located therein and biassed by a spring 33 towards cylinder end wall 35. A connection 37 in end wall 35 is connected through the hand pump 19 (not shown in FIG. 2) via line 17 to cylinder space 15 between the piston 3,5 in the embodiment of FIG. 1. A further connection 39 towards the other end 40 of the cylinder 29, connects with the reservoir 13. The piston 31 has a bore 41 extending axially therethrough, the bore 41 having a shoulder which forms a valve seat 43 for a ball 45. The ball 45 is biassed against the valve seat 43 by a spring 47, the spring engaging against a washer 49 secured in the bore 41. Mounted on the said other end 40 of the cylinder 29 is an axial, elongated projection 51 which can lift the ball 45 off the valve seat 43 as the piston 31 approaches the said other end 40 of the cylinder 29 against the spring 33.

Normally the flow detector is in the position illustrated in FIG. 2, with the spring 33 holding the piston 31 against end wall 35. When the handpump 19 is operated to pressurise the cylinder space 15, fluid is drawn, i.e. sucked by the hand pump operation, from reservoir 13 via the non-return valve formed by the ball 45 and the valve seat 43. If, however, there is any flow out of the cylinder space 15 e.g. power piston leakage, with the handpump open, this will create a pressure drop across the piston 31 causing it to move to the left in FIG. 2, against the spring 33, until the projection 51 engages and lifts the ball 45 off the valve seat 43, allowing return flow. This piston movement can be detected by any suitable means, e.g. an induction loop, and interpreted by the controller 23.

Further when the hand pump pressure is released, the pressure fluid first moves piston 31 to the left in FIG. 2, until projection 51 opens the ball valve 45, 43. Then the pressure fluid can return to the reservoir 13.

It will be appreciated that the secondary brake release piston 5 has seals which are only occasionally pressurised. They therefore suffer almost no wear. If the detection system based on the reservoir weir, as described hereabove is used, the secondary piston seals will be monitored for leakage under almost zero pressure—a condition most likely to cause leakage. When the handpump 19 pressurises cylinder space 15 the secondary piston seals are pressurised and the probability of leakage is further reduced. Thus, the weir detection system is considered adequate for monitoring the secondary piston seals.

Figure 3:
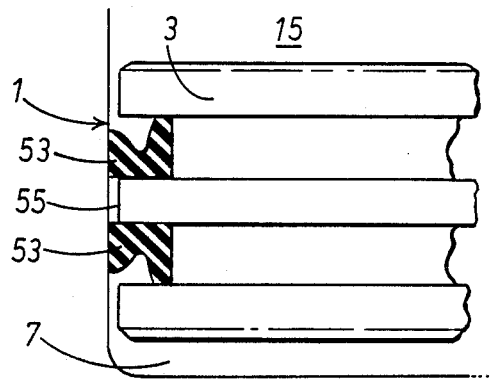
FIG. 3 is a part cross-sectional view of one embodiment of a power piston suitable for use in the present invention.
Figure 4:
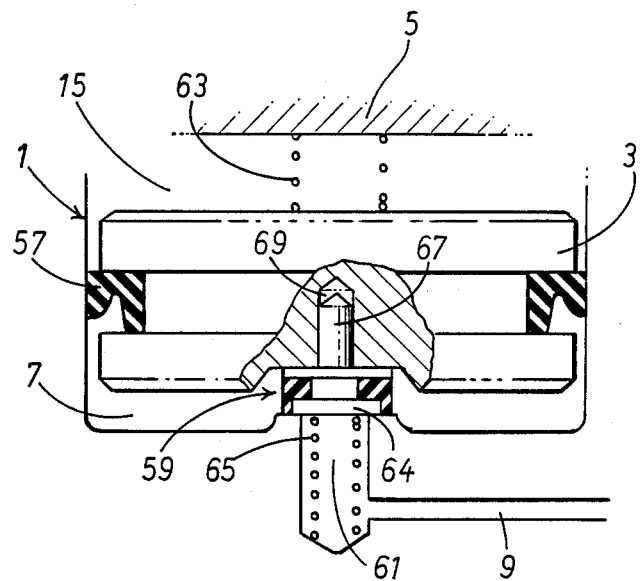
FIG. 4 is a part cross-sectional view of a further embodiment of power piston suitable for use in the present invention.

It will also be appreciated that the seals on the power piston 3 are pressurised in the reverse direction on the few occasions when the handpump 19 is used. Whilst seals exist which permit this usage, it is not regarded as the best practice. FIGS. 3 and 4 show two possible seal arrangements which take account of reverse pressurisation.

The power piston 3 in FIG. 3 has two annular seals 53 which operate in opposite directions. However, the space 55 between the seals must not be allowed to trap pressure and thus one or other seal must be designed to allow reverse flow.

FIG. 4 shows another seal arrangement which retains a single power piston seal 57 to separate the power space 7 from the handpump space 15. This seal 57 is designed to allow fluid to flow from the handpump space 15 to the power space 7, but not vice-versa. The piston also carries a further seal 59 which prevents flow into the port 61 leading to power line 9 when the power piston is held down by the spring 63 located between the pistons 3,5. In this position the handpump pressure is restrained by the further seal 59. This further seal 59 does not prevent the entry of hydraulic fluid into the cylinder space 7 from power line 9 and in normal operation the power piston is lifted by the power fluid so that the further seal 59 is not in engagement with port 61 and does not affect the power system control.

Further seal 59 is mounted on a metal bobbin 64 which is held in contact with the power piston by a spring 65, the bobbin 64 having an axial projection 67 which engages freely in a bore 69 in the power piston.

The purpose of the bobbin 64 and spring 65 is to prevent the further seal 59 from being lifted against an appreciable pressure difference which could cause extrusion damage to the seal. Such a pressure difference could occur if, for instance, the power side was pressurised by the handpump while there was air in the power chamber. The separate bobbin 64 allows the chamber to expand to destroy the trapped pressure before the seal 59 lifts.

The present invention thus provides a brake actuation system for a vehicle, with an automatic fail-safe system incorporated.

I claim:

1. An actuation system for a brake comprising two pistons which are axially slidable in a common volume, the space between one end of the volume and one piston being connected to a primary power system to exert a force on said one piston, and the space between said pistons being connected to a secondary power system to exert a force on said second piston, said second piston acting to control the brake, said primary power system comprising a power system pump connected between a reservoir of pressure fluid and said space between said one of the volume and said one piston to draw pressure fluid from said reservoir and pump same into said space and when said power system is activated, a controller for monitoring the operation of said power pump to provide an indication to an operator when the primary power system is operational, and a flow detector located in the primary system and being monitored by said controller to provide an indication to an operator when fluid is flowing in said primary power system, said flow detector comprising an axially displaceable detector piston located within a cylindrical cavity said detector piston being responsive to fluid pressure from said power pump and having a bore extending axially therethrough, the bore being formed with a shoulder which forms a valve seat for a spring biassed valve closure member, an elongate projection located at one end of the cylindrical cavity extending axially thereof and being arranged to pass through the said bore to lift the valve closure member as said detector piston is moved axially under the action of pressure fluid against a spring, and detection means monitoring the movement of said detector piston.

2. A brake actuation system according to claim 1, wherein the common volume is formed by a cylindrical cavity within which the two pistons are coaxially located.

3. A brake actuation system according to claim 1 or claim 2, wherein a common reservoir of pressure fluid is connected in both the primary and secondary power systems, the reservoir having a weir separating the pressure fluid supply to each system with level detecting means provided on each side of the weir, said level detecting means being connected to a controller adapted to provide an indication to an operator when a particular level change occurs.

4. A brake actuation system according to claim 1 or claim 2, wherein said one piston has two annular seals located on its periphery so as to operate in opposite axial directions.

5. A brake actuation system according to claim 1 or 2, wherein said one piston has an annular seal located on its periphery and arranged to prevent fluid flow from the primary power system side of said one piston to the space between said pistons, a further seal being carried by said one piston, said further seal being arranged to prevent flow through a port from the common volume into the primary power system, when said one piston is held with said further seal against said port by a spring located between said pistons.

6. An actuating system for a brake comprising two pistons which are axially slidable in a common volume, the space between one end of the volume and one piston being connected to a primary power system to exert a force on said one piston and the space between said pistons being connected to a secondary power system to exert a force on said second piston, said second piston acting to control the brake, said secondary power system comprising a hand pump which is connected between a reservoir and the space between said piston, a flow detector in said secondary system and a controller for monitoring the operation of said flow detector to provide an indication when said secondary power system is operational, said flow detector comprising an axially displaceable detector piston located within a cylindrical cavity and responsive to fluid pressure existing in the space between said first mentioned pistons, said detector piston having a bore extending axially therethrough, the bore being formed with a shoulder which forms a valve seat for a spring biassed valve closure member, an elongate projection located at one end of the cylindrical cavity extending axially thereof and being arranged to pass through the said bore to lift the valve closure member as said detector piston is moved axially under the action of pressure fluid against a spring, and detection means monitoring the movement of said detector piston.

7. A brake actuation system according to claim 6, wherein the common volume is formed by a cylindrical cavity within which the two positions are coaxially located.

8. A brake actuation system according to claims 6 or 7, wherein said one piston has two annular seals located on its periphery so as to operate in opposite axial directions.

9. A brake actuation system according to claims 6 or 7, wherein said one piston has an annular seal located on its periphery and arranged to prevent fluid flow from the primary power system side of said one piston to the space between said pistons, a further seal being carried by said one piston, said further seal being arranged to prevent flow through a port from the common volume into the primary power system, when said one piston is held with said further seal against said port by a spring located between said pistons.

* * * * *